(12) United States Patent
Kuo et al.

(10) Patent No.: US 7,080,613 B2
(45) Date of Patent: Jul. 25, 2006

(54) METHOD FOR AUTO-IGNITION COMBUSTION CONTROL

(75) Inventors: Tang-Wei Kuo, Troy, MI (US); James A. Eng, Troy, MI (US); Barry L. Brown, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/981,971

(22) Filed: Nov. 5, 2004

(65) Prior Publication Data

US 2006/0005806 A1    Jan. 12, 2006

Related U.S. Application Data

(60) Provisional application No. 60/587,163, filed on Jul. 12, 2004.

(51) Int. Cl.
*F02B 75/02* (2006.01)
*F01L 1/34* (2006.01)
*F02M 27/07* (2006.01)
*F02B 3/00* (2006.01)
*F02B 15/00* (2006.01)

(52) U.S. Cl. ............... 123/64; 123/568.14; 123/90.11; 123/90.15; 123/302

(58) Field of Classification Search ............... 123/21, 123/59.8, 64, 90.11, 90.12, 89.15, 90.16, 123/90.17, 90.18, 295, 299, 300, 302, 305, 123/316, 568.14, 58.8, 90.15
See application file for complete search history.

(56) References Cited

U.S. PATENT DOCUMENTS 4,945,870 A * 8/1990 Richeson ............... 123/90.11
5,918,577 A * 7/1999 Martelli et al. ............. 123/295
6,082,342 A    7/2000 Duret et al. ............ 123/568.14
6,321,715 B1 * 11/2001 Dong ........................ 123/295
6,386,177 B1    5/2002 Urushihara et al. ......... 123/299
6,497,213 B1 * 12/2002 Yoshizawa et al. ......... 123/299
6,615,771 B1 *  9/2003 Denger et al. ................ 123/21
2001/0023667 A1 *  9/2001 Miura ........................ 123/21
2003/0154964 A1 *  8/2003 Gaessler et al. ....... 123/568.14

(Continued)

FOREIGN PATENT DOCUMENTS

WO    WO0146571    6/2001

(Continued)

OTHER PUBLICATIONS

PCT Search Report re corresponding PCT/US05/23850 mailed Feb. 17, 2006.

*Primary Examiner*—Willis R. Wolfe, Jr.
(74) *Attorney, Agent, or Firm*—Kathryn A. Marra

(57) ABSTRACT

A method is disclosed for controlling the air-fuel ratio in a four-stroke gasoline direct-injection controlled auto-ignition combustion. The engine is operated with two sequential pairs of expansion and contraction strokes during two revolutions of the engine crank, the two revolutions defining a combustion cycle. A system is employed for variably actuating the intake and exhaust valves and adjusting the flow of air and burned gases entering the combustion chamber. Adjusting the flow affects the resulting air-fuel ratio in the combustion chamber. The valve actuating system is employable to operate the intake and exhaust valves with an exhaust re-compression or an exhaust re-breathing valve strategy. Either valve strategy affects the air-fuel ratio in the cylinder and causes a proportion of burned gases from previous combustion cycles to be retained in the cylinder to provide the necessary conditions for auto-ignition of the air-fuel mixture.

6 Claims, 4 Drawing Sheets

U.S. PATENT DOCUMENTS

| | | | | |
|---|---|---|---|---|
| 2005/0000478 A1* | 1/2005 | Kuo et al. | ............... | 123/90.15 |
| 2005/0000485 A1* | 1/2005 | Kuo et al. | .................. | 123/299 |
| 2005/0211219 A1* | 9/2005 | Strom et al. | ................. | 123/299 |
| 2006/0005788 A1* | 1/2006 | Kuo et al. | .................... | 123/21 |

FOREIGN PATENT DOCUMENTS

| | | |
|---|---|---|
| WO | WO0146572 | 6/2001 |
| WO | WO0146573 | 6/2001 |

* cited by examiner

METHOD FOR AUTO-IGNITION COMBUSTION CONTROL

CROSS-REFERENCE TO RELATED APPLICATIONS

This application claims priority from U.S. Provisional Patent Application No. 60/587,163 filed Jul. 12, 2004.

TECHNICAL FIELD

This invention relates to a method for controlling the auto-ignition combustion process in a gasoline direct-injection controlled auto-ignition engine at light load and during transient operation.

BACKGROUND OF THE INVENTION

To improve thermal efficiency of gasoline internal combustion engines, dilute combustion, using either air or re-circulated exhaust gas, is known to give enhanced thermal efficiency and low NOx emissions. There is, however, a limit at which an engine can be operated with a diluted mixture because of misfire and combustion instability as a result of a slow burn. Known methods to extend the dilution limit include: 1) improving ignitability of the mixture by enhancing ignition and fuel preparation; 2) increasing the flame speed by introducing charge motion and turbulence; and 3) operating the engine under controlled auto-ignition combustion.

The controlled auto-ignition process is sometimes called a Homogeneous Charge Compression Ignition (HCCI) process. In this process, a mixture of combusted gases, air, and fuel is created and auto-ignition is initiated simultaneously from many ignition sites within the mixture during compression, resulting in very stable power output and high thermal efficiency. The combustion is highly diluted and uniformly distributed throughout the charge. Therefore, the burned gas temperature and hence NOx emissions are substantially lower than that of traditional spark ignition engines based on propagating flame front and diesel engines based on an attached diffusion flame. In both spark ignition and diesel engines, the burned gas temperature is highly heterogeneous within the mixture with very high local temperatures creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low, and controlled auto-ignition at part load is difficult to achieve. Known methods to induce controlled auto-ignition at low and part loads include: 1) intake air heating; 2) variable compression ratio; and 3) blending gasoline with fuel that has wider auto-ignition ranges than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation with unconventional valve means. The following are descriptions of two such valve strategies, specifically an exhaust re-compression valve strategy and an exhaust re-breathing valve strategy. With either valve strategy, a high proportion of residual combustion products from previous combustion cycles is retained to provide the necessary conditions for auto-ignition in a highly diluted mixture. The range of engine speeds and loads in which controlled auto-ignition combustion can be achieved is greatly expanded using a conventional compression ratio.

One such valve strategy is an exhaust re-compression valve strategy. A four-stroke internal combustion engine has been disclosed that provides for auto-ignition by controlling the motion of the intake and exhaust valves of a combustion chamber to ensure that a fuel/air charge is mixed with combusted gases to generate conditions suitable for auto-ignition. In particular, this engine operates with a mechanically cam-actuated exhaust valve that is closed earlier in the exhaust stroke than normal four-stroke engines to trap combusted gases for subsequent mixing with an intake of a fuel and air mixture.

Further, a similar method of operating a four-stroke internal combustion engine has been disclosed in which combustion is achieved at least partially by an auto-ignition process. Flows of fuel/air charge and combusted gases are regulated by hydraulically controlled valve means in order to generate conditions in the combustion chamber suitable for auto-ignition operation.

The valve means used includes an intake valve controlling flow of the fuel/air mixture into the combustion chamber from an inlet passage and an exhaust valve controlling flow of exhaust combusted gases from the combustion chamber to an exhaust passage. The exhaust valve opens (EVO) at approximately 10 to 15 degrees before bottom dead center in the expansion stroke, and closes (EVC) during the exhaust stroke in a range of 90 to 45 degrees before top dead center. The intake valve is opened (IVO) later in the four-stroke cycle than usual in a normal four-stroke engine in the range of 45 to 90 degrees after top dead center during the intake stroke.

The early exhaust valve closing and late intake valve opening provides a negative valve overlap period (EVC-IVO) in which both exhaust and intake valves are closed for trapping of combusted gas, which later mixes with the inducted fuel/air charge during the intake stroke and thereby promotes the auto-ignition process. The intake valve is then closed (IVC) roughly 30 degrees after bottom dead center in the compression stroke. This is generally referred to as an exhaust re-compression valve strategy.

A similar method of operating a direct-injection gasoline four-stroke internal combustion engine has been disclosed in which combustion is achieved at least partially by an auto-ignition process. Flows of air and combusted gases are regulated by the hydraulically controlled valve means as described above. The fuel is delivered directly into the combustion chamber by a gasoline injector. The gasoline injector is said to inject fuel during either the intake stroke or the subsequent compression stroke in a single engine cycle.

Furthermore, a system and a method for operating a four-stroke internal combustion engine has been disclosed in which part load operation is achieved by an auto-ignition process. Flows of air and combusted gases are regulated by either mechanical (phase shift of a single cam or shift between two different cams) or electromagnetic valve means similar to that described above. Control of the auto-ignition process is divided into three modes depending upon the magnitude of a predetermined operating parameter. The operating parameter is indicative of either the engine load or the engine speed. The three auto-ignition combustion modes are: a gasoline reform auto-ignition combustion mode, an auto-ignition stratified charge combustion mode, and an auto-ignition homogeneous charge combustion mode.

In the gasoline reform auto-ignition combustion mode that may be selected during operation with low part load, a first fuel injection during the negative valve overlap period produces a sufficient amount of chemical reaction for promotion of auto-ignition of the fuel/air mixture produced by a second fuel injection during the subsequent compression stroke. The fuel quantity for the first injection is disclosed to be either constant or inversely proportional to the engine load. The corresponding injection timing, however, is disclosed to be either retarded in a continuous manner or held constant as the engine load increases. In the auto-ignition stratified charge combustion mode that may be selected during operation with intermediate part load, a fuel injection during the compression stroke supports auto-ignition. The injection timing advances as the engine load increases. In the auto-ignition homogeneous charge combustion mode that may be selected during operation with high part load, a fuel injection during the intake stroke supports auto-ignition. The injection timing is disclosed to be invariant against variation of engine load.

We have demonstrated a strategy for operating a direct-injection gasoline four-stroke internal combustion engine with enhanced controlled auto-ignition combustion from low to medium load. Flows of air and combusted gases are regulated by either electro-hydraulically controlled valve means (fully-flexible valve actuation) similar to that described above or a mechanically controlled valve means (phase shift of a single cam or shift between two different cams) similar to that described above. The valve means is used in conjunction with a gasoline direct injector having multiple injection capability during a single engine cycle. The injection timing of fuel injection and the proportion of fuel split, if desired, are electronically controlled. Different negative valve overlap periods and different injection strategies are required at different engine loads for optimal control of combustion phasing and hence engine performance.

Control of the auto-ignition process is divided into three stages from low to medium load. It is experimentally confirmed that for maintaining optimal auto-ignition combustion phasing throughout the stated load range, the negative valve overlap period increases with decreasing engine load. Further, during operation with low part load (Stage 1), a first injection of a fixed amount of fuel during the negative valve overlap period produces a sufficient amount of heat and chemical species that are more reactive than the fuel for promotion of auto-ignition of the fuel/air mixture produced by a second fuel injection during the subsequent compression stroke. The injection timing for the first injection retards and the injection timing for the second injection advances in a continuous manner as the engine load increases. During operation with intermediate part load (Stage 2), a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. During operation with high part load (Stage 3), a single fuel injection during the intake stroke supports auto-ignition. The injection timing retards as the engine load increases. This method has been shown to be effective in extending the load range of a direct-injection gasoline four-stroke auto-ignition engine using a conventional compression ratio.

A second valve strategy is an exhaust re-breathing valve strategy. A method of operating a four-stroke internal combustion engine has been disclosed in which combustion is achieved at least partially by an auto-ignition process. Flow of fuel/air charge and combusted gases are regulated by hydraulically controlled valve means in order to generate conditions in the combustion chamber suitable for auto-ignition operation. The valve means used include an intake valve controlling flow of fuel/air mixture into the combustion chamber from an inlet passage and an exhaust valve controlling flow of exhaust combusted gases from the combustion chamber to an exhaust passage. The exhaust valve is opened for two separate periods during the same four-stroke cycle. The exhaust valve is opened for a first period to allow combusted gases to be expelled from the combustion chamber. The exhaust valve is opened for a second period to allow combusted gases previously exhausted from the combustion chamber to be drawn back into the combustion chamber. The double opening of the exhaust valve during each four-stroke cycle creates the necessary condition for auto-ignition in the combustion chamber. This is generally referred to as an exhaust re-breathing valve strategy.

We have demonstrated a method of operating a direct-injection gasoline four-stroke internal combustion engine with extended capability for controlling the auto-ignition process at low engine load. In this method, a valve strategy that employs the double opening of the exhaust valve and a single opening of the intake valve is used in conjunction with a gasoline direct injector having multiple injection capability during a single engine cycle. Both intake and exhaust valve means are hydraulically controlled. By choosing appropriately the closing timing of the exhaust valve for the first opening event and the opening timings of both the intake valve and the exhaust valve for the second opening event, different levels of in-cylinder vacuum can be generated. Higher in-cylinder vacuum leads to increased charge temperature at intake valve closing and results in improved combustion stability for a controlled auto-ignition engine.

The combustion stability of the engine is further improved with an intelligent split-injection strategy that features two injections per engine cycle. The first injection event delivers 10–30% of the total injected fuel per cycle into the combustion chamber during the early part of the intake stroke while the second injection event delivers the remaining fuel during the later part of the compression stroke. The injection timing of each injection event and the proportion of fuel split are electronically controlled. Different levels of in-cylinder vacuum and split-injection strategies are required at different engine loads for optimal control of combustion phasing and engine performance. Both demonstrations have been shown to effectively extend the low load limit of direct-injection gasoline four-stroke auto-ignition engines.

We have also demonstrated a strategy for operating a direct-injection gasoline four-stroke internal combustion engine with enhanced controlled auto-ignition combustion from low to medium load. Flows of air and combusted gases are regulated by either electro-hydraulically controlled valve means (fully-flexible valve actuation) similar to that described above or mechanically controlled valve means (phase shift of a single cam or shift between two different cams). The valve means is used in conjunction with a gasoline direct injector having multiple injection capability during a single engine cycle similar to that described above. The injection timing of fuel injection and the proportion of fuel split, if desired, are electronically controlled. Different levels of in-cylinder vacuum and injection strategies are required at different engine loads for optimal control of combustion phasing and hence engine performance. Control of the auto-ignition process is divided into two stages from low to high part load.

It is experimentally confirmed that for maintaining optimal auto-ignition combustion phasing throughout the load range, the required in-cylinder vacuum decreases with increasing engine load. Further, during operation with low part load, a first injection of 10–30% of total injected fuel during the early part of the intake stroke promotes auto-ignition of the fuel/air mixture produced by a second fuel injection during the subsequent compression stroke. The injection timing for the first injection retards and the injection timing for the second injection advances in a continuous manner as the engine load increases to avoid excessive smoke emission. During operation with intermediate and high part loads, a single fuel injection during the intake stroke supports auto-ignition. The injection timing retards as the engine load increases to avoid excessive smoke emission. This method has been shown to be effective in extending the load range of a direct-injection gasoline four-stroke auto-ignition engine using a conventional compression ratio.

The above descriptions depict our methodologies in operating direct-injection controlled auto-ignition gasoline engines over practical speed and load ranges under steady state operations. For successful HCCI engine operation with transient, control parameters other than spark, injection, and valve timings are important. For example, under a given injection and valve strategy, controlled auto-ignition combustion is greatly affected by the delivered air-fuel ratio. Hence, control of the air-fuel ratio in a gasoline direct-injection controlled auto-ignition engine is desirable.

SUMMARY OF THE INVENTION

The present invention provides a method for controlling the air-fuel ratio in a gasoline direct-injection controlled auto-ignition engine at constant intake manifold pressure and fueling rate. In one embodiment, a flow control valve is employed in one branch of the intake runners for a two-intake-valve per cylinder engine. A swirl control valve that is currently used in a stratified-charge gasoline direct-injection engine for in-cylinder air motion control may be used as the flow control valve. The engine is operated with either an exhaust re-compression valve strategy or an exhaust re-breathing valve strategy. Variation of the flow control valve setting has a profound effect on the amount of fresh charge air inducted into the cylinder and hence the delivered air-fuel ratio. The effectiveness of the flow control valve on air-fuel ratio control differs depending on the valve strategy and the engine speed. In particular, closing the flow control valve results in lower delivered air-fuel ratio at a fixed intake manifold pressure for all valve strategies and the rate of reduction increases with increasing engine speed. Further, the reduction in air-fuel ratio is much more pronounced using an exhaust re-breathing strategy than with using an exhaust re-compression strategy.

In another embodiment, the method employs a variable valve lift control assuming the availability of a workable variable valve actuation system in the engine. The engine is operated with either an exhaust re-compression valve strategy or an exhaust re-breathing valve strategy. The effectiveness of valve lift on air-fuel ratio control varies depending on the engine speed and valve strategy used for controlled auto-ignition combustion. In general, the delivered air-fuel ratio decreases with decreasing valve lift. The effectiveness of valve lift control on air-fuel ratio increases with increasing engine speed. In particular, for the exhaust re-compression strategy, the delivered air-fuel ratio only decreases with decreasing exhaust valve lift at a fixed intake manifold pressure. The intake valve lift has no effect on the delivered air-fuel ratio with the exhaust re-compression strategy. For the exhaust re-breathing strategy, however, the exhaust valve lift has no effect on delivered air-fuel ratio. The delivered air-fuel ratio is affected only by the intake valve lift.

These and other features and advantages of the invention will be more fully understood from the following description of certain specific embodiments of the invention taken together with the accompanying drawings.

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engine.

Figure 1A:
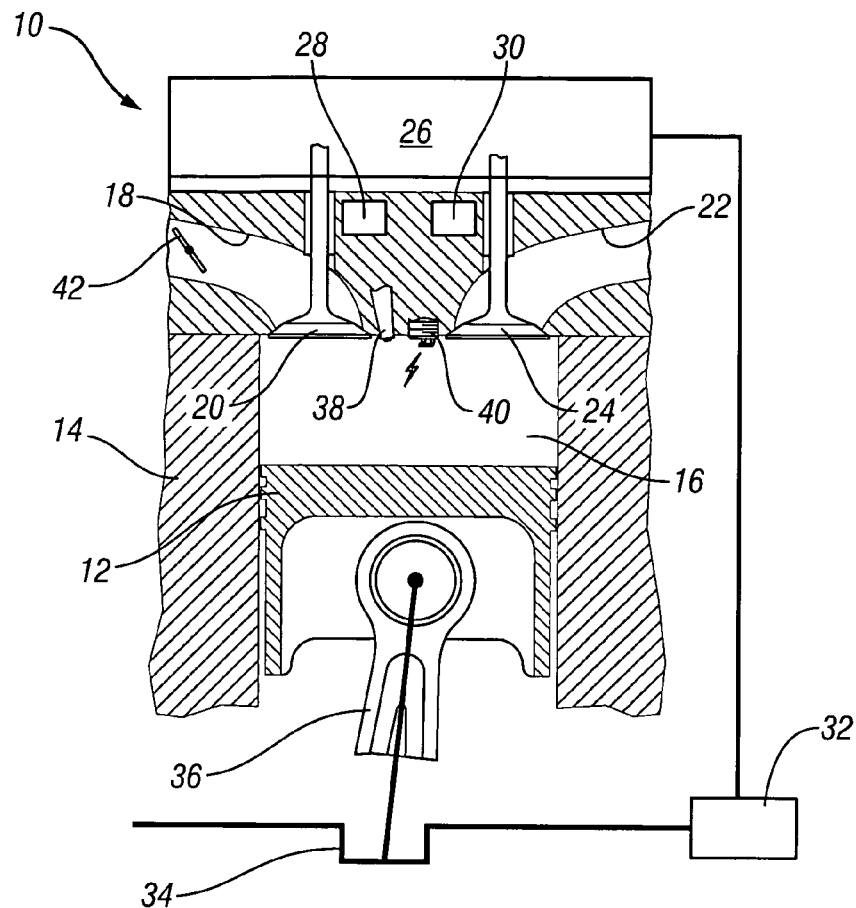
FIG. 1A is a schematic illustration of a single cylinder direct-injection gasoline four-stroke internal combustion engine according to the present invention.

A schematic representation of an embodiment of a single-cylinder direct-injection four-stroke internal combustion engine 10 is shown in FIG. 1A. In the engine, a piston 12 is movable in a cylinder 14 and defines with the cylinder 14 a variable volume combustion chamber 16. An intake passage 18 supplies air into the combustion chamber 16. Flow of air into the combustion chamber 16 is controlled by intake valve 20. Combusted gases can flow from the combustion chamber 16 via an exhaust passage 22 and flow of combusted gases through the exhaust passage 22 is controlled by exhaust valve 24.

The engine of the present invention as shown in FIG. 1A has a hydraulically controlled valve train with an electronic controller 26 which is programmable and hydraulically controls the opening and closing of both the intake 20 and exhaust valves 24. The electronic controller 26 will control the movement of the intake valve 20 and exhaust valve 24 having regard to the position of the intake and exhaust valves 20 and 24 as measured by two position transducers 28 and 30. The controller 26 will also have regard to the position of the engine, which will be measured by a rotation sensor 32 which is connected to a crankshaft 34 of the internal combustion engine, the crankshaft 34 being connected by a connecting rod 36 to the piston 12 reciprocate in the cylinder 14.

A gasoline direct injector 38, controlled by the electronic controller 26, is used to inject fuel directly into the combustion chamber 16. A spark plug 40, also controlled by the electronic controller 26, is used to enhance the ignition timing control of the engine across the engine load range. While the simple engine described above does not need a spark plug for operation under controlled auto-ignition combustion, it has proven desirable to use a spark plug to complement the auto-ignition process, particularly in start-up conditions. Also, it has proven desirable to rely on auto-ignition only in part-load/low speed operating conditions and to use spark ignition during high load/high speed operating conditions.

Figure 1B:
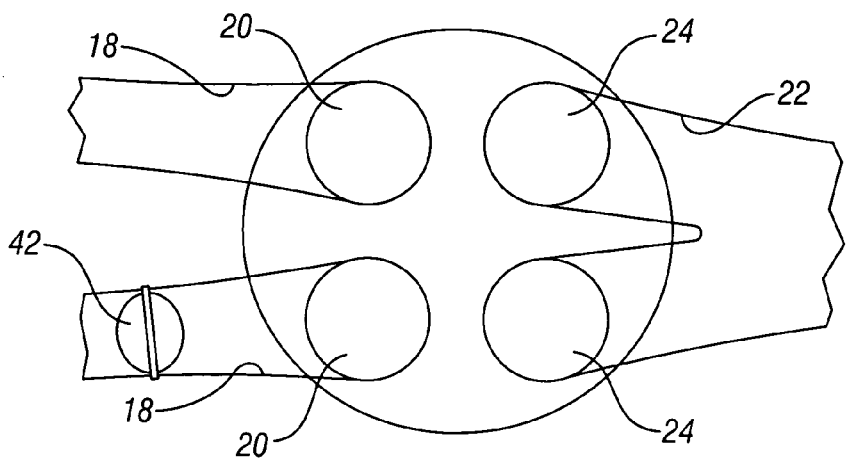
FIG. 1B is a top schematic view of the engine of FIG. 1A.

The engine shown in FIG. 1A also includes a flow control valve 42 according to the method of present invention. The flow control valve 42 is located inside intake passage 18, and may be located in one branch of the intake runners of the intake passage 18 if the engine is configured as a two-intake-valve per cylinder engine as shown in FIG. 1B. The flow control valve 42 may be any type of control valve. For purposes of example, an existing swirl control valve that has previously been used for in-cylinder air motion control in a stratified-charge gasoline direct-injection engine is used herein to demonstrate the effectiveness of the present invention.

Figure 2:
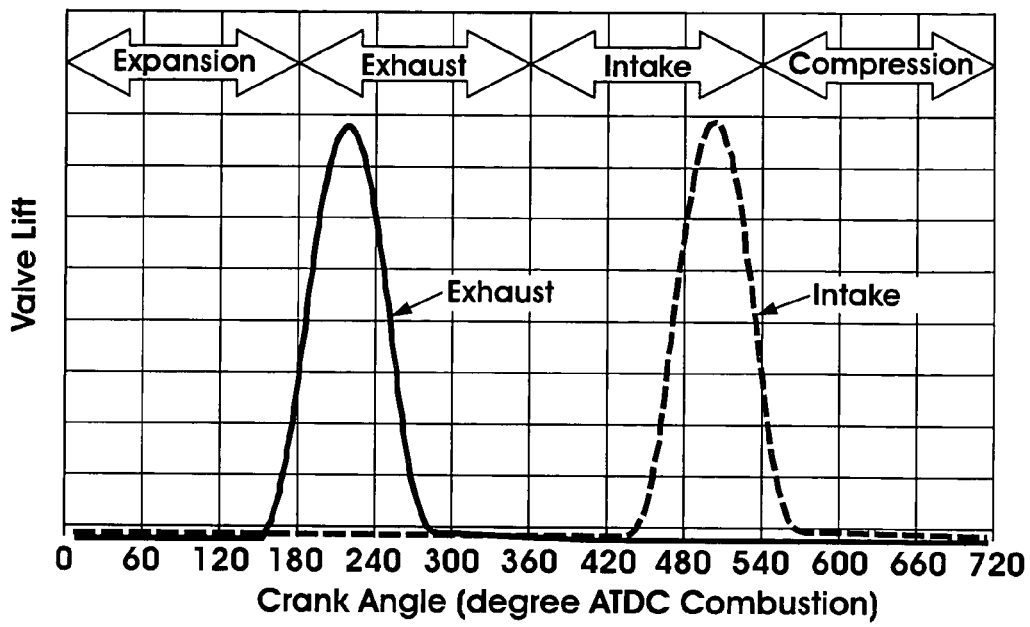
FIG. 2 is a graph of valve lift profiles as a function of crank angle for the exhaust and intake valves of a four-stroke internal combustion engine (at 1875 rpm/85 kPa NMEP) operating with an exhaust re-compression valve strategy using a fully-flexible valve actuation (FFVA) system.

Control of the motion of the intake valve 20 and exhaust valve 24 in accordance with an exhaust re-compression strategy is illustrated in FIG. 2 for a controlled auto-ignition engine operating at 1875 rpm and 85 kPa NMEP and using a fully flexible valve actuation (FFVA) system. In FIG. 2, the exhaust valve 24, shown by a solid line, opens at approximately 30 degrees before bottom dead center in the expansion stroke and closes during the exhaust stroke approximately 90 degrees before top dead center. The intake valve 20, shown by a dashed line, opens later in the engine cycle than in a normal spark ignition engine, at approximately 90 degrees after top dead center during the intake stroke. The early exhaust valve closing and late intake valve opening provides a negative valve overlap period where both the exhaust 24 and intake valves 20 are closed for trapping of combusted gas which later mixes with the fuel/air charge inducted during the intake stroke, thereby promoting the auto-ignition process. The intake valve closes roughly 30 degrees after bottom dead center in the compression stroke.

Figure 3:
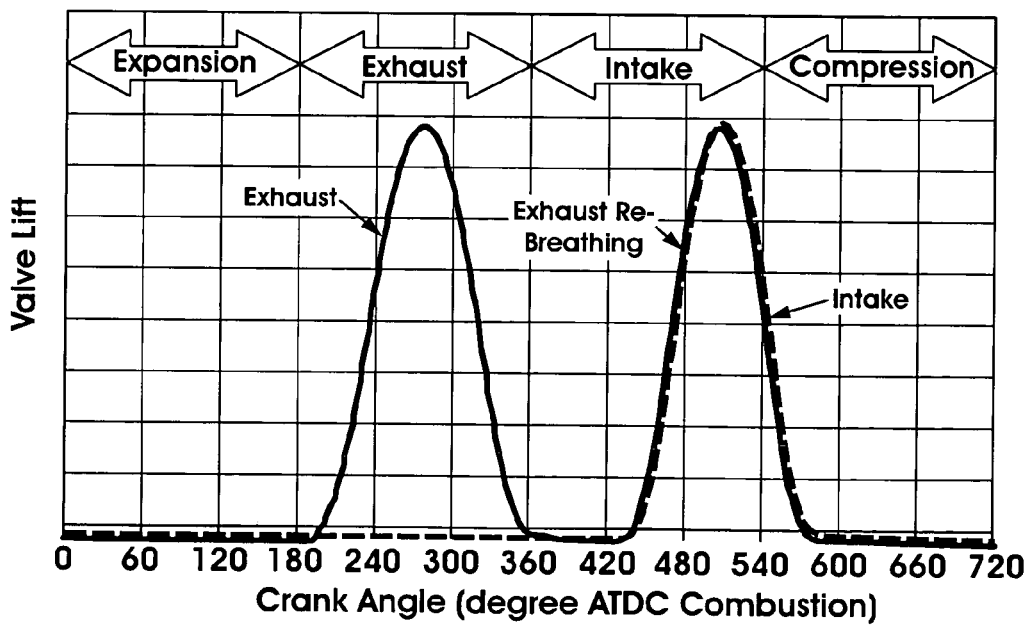
FIG. 3 is a graph of valve lift profiles as a function of crank angle for the exhaust and intake valves of a four-stroke internal combustion engine (at 1875 kPa/85 kPa NMEP) operating with an exhaust re-breathing valve strategy using a FFVA system.

Control of the motion of the intake valve 20 and exhaust valve 24 in accordance with an exhaust re-breathing valve strategy is illustrated in FIG. 3 for a controlled auto-ignition engine operating at 1875 rpm and 85 kPa NMEP and using a fully flexible valve actuation (FFVA) system. In FIG. 3, the exhaust valve 24, shown by a solid line, is opened twice during 720 degrees rotation of the crankshaft 34, i.e., one engine cycle. During the first period of opening, combusted gases are expelled from the combustion chamber 16 to the exhaust passage 22. During the second period of opening, previously exhausted combusted gases are drawn back into the combustion chamber 16 from the exhaust passage 22 at the same time as air or fuel/air charge is drawn into the combustion chamber 16 from the inlet passage 18. Thus, mixing of combusted gases and air or fuel/air charge is achieved and promotes the correct conditions for auto-ignition.

Auto-ignition of the mixture of combusted gases, air and either premixed or direct-injected fuel occurs after compression of the mixture during the compression stroke. The combustion of the mixture then causes the gases to expand in the power stroke. The four-stroke cycle then starts again. In particular, for the engine operating conditions given above, the exhaust valve 24 is opened for the first time during an engine cycle at roughly 20 degrees after bottom dead center at the end of the expansion stroke. The exhaust valve 24 is then closed for the first time near the end of the exhaust stroke. Both intake valve 20, shown by a dashed line, and exhaust valve 24 are opened about 80 degrees after the end of the exhaust stroke and closed approximately 30 degrees after the end of the intake stroke.

Figure 4:
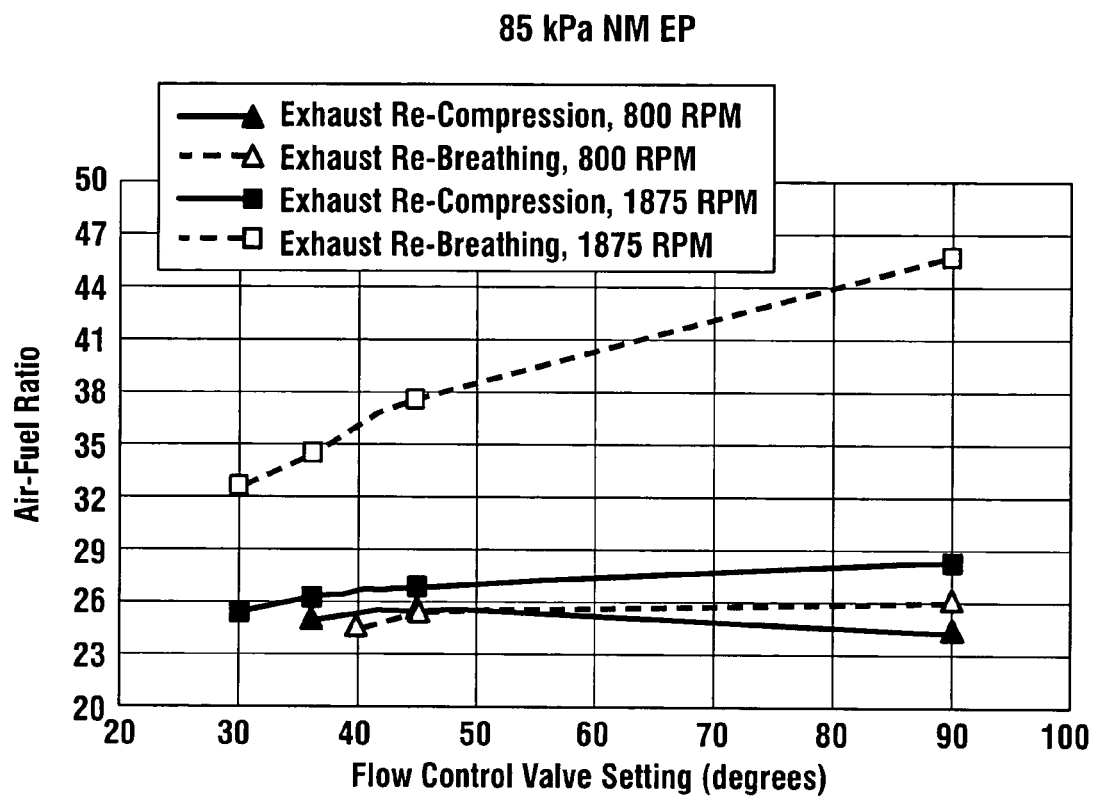
FIG. 4 is a graph of air-fuel ratio as a function of flow control valve setting for a direct-injection gasoline four-stroke internal combustion engine operating with either an exhaust re-compression valve strategy or an exhaust re-breathing valve strategy at engine speeds of 800 and 1875 rpm in accordance with the present invention.

In one embodiment of the present invention, a method for air-fuel ratio control includes employing a flow control valve as illustrated in FIGS. 1a and 1b. FIG. 4 illustrates the experimentally observed variations in air-fuel ratio as a function of flow control valve setting in a gasoline direct-injection controlled auto-ignition engine using either an exhaust re-compression or an exhaust re-breathing valve strategy at 85 kPa NMEP load and engine speeds of either 800 or 1875 rpm. A flow control valve setting of 30 degrees corresponds to a fully closed position while a setting of 90 degrees corresponds to a fully open position. Partially opened positions correspond to a flow control valve setting between 30 and 90 degrees. FIG. 4 indicates that: 1) the air-fuel ratio is insensitive to flow control valve setting at 800 rpm (solid and dashed lines with solid triangles) regardless of the valve strategy used; 2) the air-fuel ratio is sensitive to flow control valve setting at 1875 rpm for both exhaust re-compression (line with solid squares) and exhaust re-breathing (line with open squares) valve strategies; and 3) the air-fuel ratio decreases with decreasing flow control valve setting from 90 degrees (fully open) to 30 degrees (fully closed). The decrease in air-fuel ratio is much more pronounced with engine operating with the exhaust re-breathing strategy (46 to 33) than with the exhaust re-compression strategy (28 to 25).

Figure 5:
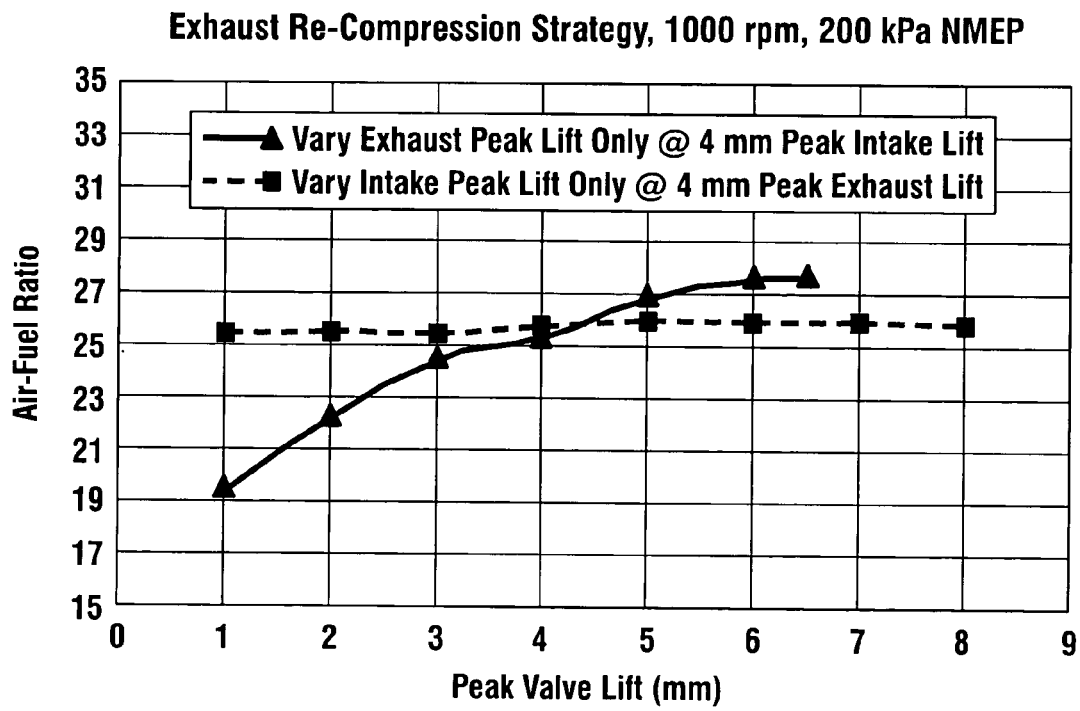
FIG. 5 is a graph of air-fuel ratio as a function of peak valve lift for a direct-injection gasoline four-stroke internal combustion engine operating with an exhaust re-compression valve strategy at 1000 rpm in accordance with the present invention.
Figure 6:
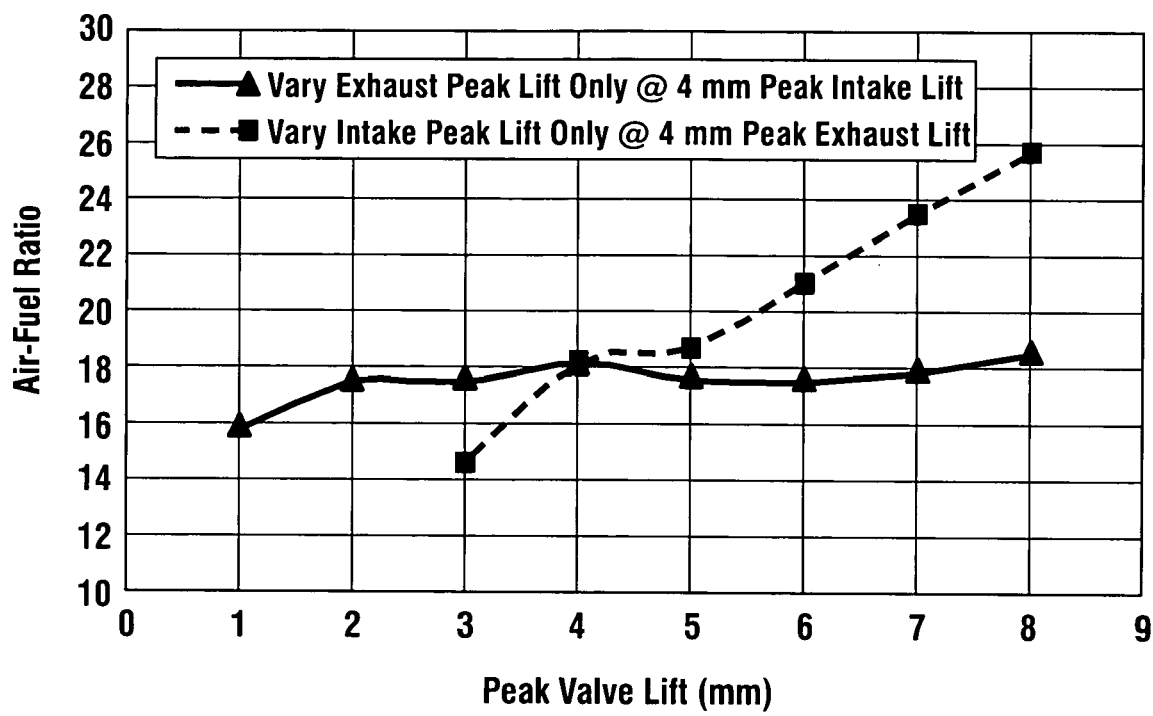
FIG. 6 is a graph of air-fuel ratio as a function of peak valve lift for a direct-injection gasoline four-stroke internal combustion engine operating with an exhaust re-breathing valve strategy at 1000 rpm in accordance with the present invention.

In another embodiment of the present invention, a method for air-fuel ratio control includes employing variable valve lift assuming the availability of a variable valve actuation system. The effectiveness of using valve lift for air-fuel ratio control varies depending on the engine speed and the valve strategy used for controlled auto-ignition combustion. In general, the delivered air-fuel ratio decreases with decreasing valve lift. The effectiveness of using valve lift control on air-fuel ratio increases with increasing engine speed. In particular, FIG. 5 shows that for the exhaust re-compression valve strategy, the delivered air-fuel ratio decreases with decreasing exhaust valve lift only (line with solid triangles). The intake valve lift has no effect on the delivered air-fuel ratio with the exhaust re-compression strategy (line with solid squares). For the exhaust re-breathing strategy (see FIG. 6), however, the exhaust valve lift has no effect on delivered air-fuel ratio (line with solid triangles). The delivered air-fuel ratio is affected only by the intake valve lift (line with solid squares).

Although valve lift was used in the second embodiment of the method for air-fuel ratio control, it is equally effective if valve duration is used instead. Further, while the intake valve 20 and exhaust valve 24 in the above embodiments are electro-hydraulically actuated, they may be actuated mechanically or electrically using electromagnetic force.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method for controlling the air-fuel ratio in a four-stroke direct injection engine operable with controlled auto-ignition combustion and having at least one cylinder containing a piston reciprocably connected with a crank and defining a variable volume combustion chamber including at least one intake valve controlling communication with an air intake and at least one exhaust valve controlling communication with an exhaust outlet, the method comprising:

operating the engine with controlled auto-ignition combustion involving homogeneous charge compression ignition with or without spark ignition assistance, the engine performing two sequential pairs of expansion and contraction strokes during two revolutions of the crank, said two revolutions of the crank defining a combustion cycle;

employing a variable valve actuating system operated with one of an exhaust re-compression valve strategy and an exhaust re-breathing valve strategy controlling cylinder charge ignition temperatures within a self ignition range at ignition of each charge; and adjusting the flow of air and burned gases entering the combustion chamber to obtain a desired air-fuel ratio for each operating speed and load condition within the self ignition range.

2. The method of claim 1 including the steps of:

providing a flow control valve in the air intake of each cylinder;

operating the engine with the exhaust re-breathing valve strategy wherein portions of the burned combustion gases discharged during the exhaust stroke are readmitted to the cylinder during the intake stroke for heating fresh intake air mixed with the trapped gases and compressed to self-ignition temperature near the end of each compression stroke; and controlling air-fuel ratio in the cylinder is preformed by adjusting the flow control valve between selected open and closed positions within a predetermined range.

3. The method of claim 1 including the step of:

operating the engine with the exhaust re-compression valve strategy wherein portions of the burned combustion gases are trapped in the cylinders for expansion and re-compression during negative valve overlap between early closing of the exhaust valves and late opening of the intake valves for heating fresh intake air mixed with the trapped gases and compressed to self-ignition temperature near the end of each compression stroke; and controlling air-fuel ratio in the cylinder is preformed by varying exhaust valve peak lift over a predetermined range.

4. The method of claim 3 wherein the predetermined range is between 1 mm and full lift.

5. The method of claim 1 including the step of:

operating the engine with the exhaust re-breathing valve strategy wherein portions of the burned combustion gases discharged during the exhaust stroke are readmitted to the cylinder during the intake stroke for heating fresh intake air mixed with the trapped gases and compressed to self-ignition temperature near the end of each compression stroke; and controlling air-fuel ratio in the cylinder is preformed by varying intake valve peak lift over a predetermined range.

6. The method of claim 5 wherein the predetermined range is between 1 mm and full lift.

* * * * *